United States Patent [19]
Mohn

[11] Patent Number: 5,657,790
[45] Date of Patent: Aug. 19, 1997

[54] VALVES FOR PRESSURIZED CONTAINERS

[75] Inventor: Christopher Dandridge Mohn, North Kingstown, R.I.

[73] Assignee: Amtrol Inc., West Warwick, R.I.

[21] Appl. No.: 540,769

[22] Filed: Oct. 11, 1995

[51] Int. Cl.[6] .................................................. F17C 13/00
[52] U.S. Cl. ............................ 137/614.2; 137/614.11; 222/147
[58] Field of Search ....................... 137/614.2, 614.11, 137/533.25, 270; 222/147

[56] References Cited

U.S. PATENT DOCUMENTS

| | | | |
|---|---|---|---|
| 3,704,813 | 12/1972 | Devol | 137/315 |
| 4,543,980 | 10/1985 | Van Der Sanden | 137/315 |
| 4,573,611 | 3/1986 | O'Connor | 222/147 |
| 5,018,552 | 5/1991 | Politi et al. | 222/147 |

*Primary Examiner*—Denise L. Ferensic
*Assistant Examiner*—Joaanne Y. Kim
*Attorney, Agent, or Firm*—Joseph J. Kaliko

[57] ABSTRACT

A non-refillable valve for a pressurized container which includes a unidirectional stepped valve housing within which a freestanding blocking element is housed. The blocking element is preferably a reversible, symmetrical check that integrally includes stop means for preventing the return of said blocking element to an initial location after it has been moved to a final location that activates the one way characteristic feature of a non-refillable valve (where activation is designed to take place after initially charging of the container). Further aspects of the invention relate to blocking elements (checks) per se which are suitable for use in non-refillable valves. In particular, blocking elements that are easy to manufacture and install, blocking elements that possess a degree of rigidity which enhances the check's ability to function as a freestanding element once inserted into a valve housing, and blocking elements which inherently reduce the risk of false check engagement during the valve assembly process, are all contemplated by the present invention. Other aspects of the invention relate to dual purpose manufacturing processes that use a single basic valve design to enable both refillable and non-refillable valves to be manufactured; and relate to products of the aforementioned processes.

42 Claims, 8 Drawing Sheets

VALVES FOR PRESSURIZED CONTAINERS

BACKGROUND OF THE INVENTION

1. Field of the Invention

The invention generally relates to valves for pressurized tanks or other pressurized containers, e.g., pressurized gas bottles.

More particularly, a first aspect of the invention relates to valves for pressurized containers which are commercially characterized as being "non-refillable" or "no-return" containers and which, for reasons of safety and otherwise, are not intended for re-use after being "charged" and/or after their initial contents have been emptied. Valves for such containers are also often referred to in the art as "single use" valves for pressurized containers.

A further aspect of the invention relates to blocking elements per se (also sometimes referred to herein as checks or stops) which are suitable for use in non-refillable valves. In particular, blocking elements that are easy to manufacture and install in such valves and which inherently reduce the risk of false check engagement during the valve assembly process (an event that would improperly activate the one way feature of the valve and not allow the container to be initially charged) are the focus of this aspect of the invention.

Yet another aspect of the invention relates to a dual purpose manufacturing process that uses a single basic valve design to enable both refillable and non-refillable valves to be manufactured.

According to this aspect of the invention, the valve design and associated manufacturing process are identical for fabricating the valve housing and fabricating/installing all internal components for both valve types (refillable and non-refillable); except that when using the novel process and valve design to make a non-refillable valve, a blocking element (such as, for example, one of the aforementioned blocking elements which inherently reduce the risk of false check engagement) is inserted into the valve housing as part of the otherwise dual purpose manufacturing process.

Stated another way, the non-refillable valve design contemplated by the aforementioned first aspect of the invention doubles as a good refillable valve structure by merely leaving out the check. This feature enables both refillable and non-refillable valves to be easily mass produced from the same basic design (the single valve design and associated manufacturing process contemplated by this further aspect of the invention) using essentially the same parts list, machine tools, etc.

Still further aspects of the invention are directed toward a valve design (both refillable and non-refillable) that utilizes a mechanically operated primary sealing mechanism (as opposed to valve designs that utilize a pressure differential to open the primary sealing mechanism) to insure seal quality; a valve design that prevents rotation of the primary sealing mechanism in the valve housing to minimize wear, extend valve life and further improve seal quality; a valve design in which the primary sealing mechanism and means for controlling the opening and closing of the valve are optionally made from discrete components formed from differing materials to enable the sealing mechanism to be chemically compatible with the fluid contents of the container even when the controlling mechanism (means for controlling the opening and closing of the valve) is not; and a valve design that is relatively simple and inexpensive, which will allow normal filling of the pressure container under proper conditions, adequate sealing of the pressure during nonuse, selective discharge of the pressure container and, in the case of the non-refillable valves contemplated by the invention, provide effective protection and prevention against improper and unauthorized filling of the container.

2. Description of the Related Art

Pressure tanks or other pressure containers are usually filled under carefully controlled conditions at a charging station and then distributed to other places for use. When empty it is intended that the containers be returned to the charging center for appropriate reuse or destruction in the case of single use containers. Unfortunately, the attractive economies of refilling containers at points of use or otherwise repressurizing them under less than carefully supervised conditions has resulted, in the less consequential cases, in the introduction of impurities or inferior refills and, in the more consequential cases, to injurious explosions. The reuse of pressure containers is highly objectionable for many reasons which relate to safety.

Non-refillable valves are well known in the prior art. Specific examples of known valves include valves of the type described in U.S. Pat. No. 4,543,980, to van der Sanden, issued Oct. 1, 1985; valves of the type described in U.S. Pat. No. 4,573,611, to O'Connor, issued Mar. 4, 1986 (assigned to the same assignee as the present invention), and the various prior art valves described in the aforementioned patents. Both the van der Sanden and O'Connor patents mentioned above are incorporated herein by reference.

In the incorporated van der Sanden patent reference is made to parent applications which illustrate techniques in which one-way ball valves can be used in conjunction with pressurized containers so as to allow for them to be initially charged through an orifice, and wherein further charging is prevented once the initial charge has been completed.

In the parent applications discussed, the prevention of further charging is performed by forcing a ball past a constriction into a final location in a manner such that it cannot return above the restriction. Once the ball is in this final location, it will block any further refilling by simply seating in the valve. However, as noted by van der Sanden, the use of a ball valve is somewhat intricate and complex and requires careful precision machining.

Other non-refillable valve teachings are discussed in van der Sanden, such as the teachings of Walker in U.S. Pat. No. 3,985,332.

Walker discloses a non-refillable safety valve for a pressurized container. The valve includes a housing having a central bore, a hollow knob unit also having a central bore, and a core having a central bore which is slideably mounted in the central bore of the housing. The hollow knob unit is in threaded engagement with the outer wall of the housing. The central bore of the housing provides communication between a port and the pressurized container for charging and selectively discharging of the pressurized container. A sealing member is provided which is slideably mounted in the lower end portion of the central bore of the core. An outwardly biased spring snaps outwardly into a channel to prevent the knob unit from being completely unscrewed. An element prevents the pressurized vessel from being refilled.

When the valve is in the position shown in FIGS. 2–4 or 6 of Walker, refill cannot be accomplished because pressure on the end of central core 220 is greater than the pressure in vessel 100 and thus caused element 132 to seat in the seat in the sealing position. In the position shown in FIG. 1 of Walker, i.e., before spring 216 has snapped into channel 220 as a result of the inward screwing or knob unit 175, element 132 is held away from the seal even if such reverse pressure differential exists. In one embodiment shown in FIGS. 5 and 6 of the Walker patent, a groove 240 is provided in knob unit 176, and outwardly biased unit 216 fits in groove 240 and the adjacent groove formed by rings 208 and 212. In this embodiment, spring 216 prevents removal of knob unit 176; otherwise, operation of the valve system of FIGS. 5 and 6 is essentially the same as that of FIGS. 1–4.

A device such as the one described by Walker is characterized by van der Sanden as being complex and expensive to manufacture.

To address the aforementioned manufacturing problems, van der Sanden describes, in the incorporated patent, a valve for a pressurized container having a blocking element therein which is adapted to occupy an initial location in which fluid can move in and out of the container past the blocking element. According to van der Sanden, the valve and blocking element are further configured such that the blocking element can be irreversibly moved to a position in which the valve permits the escape of fluid under pressure exerted from inside the container, but which automatically closes in response to exposure to an external pressure greater than the pressure inside the container. The blocking element is formed of at least one radially extending arm whose lateral radius is reduced upon movement of the blocking element from the initial location to the final location. The at least one arm expands within the final location to prevent return of the blocking element to the initial location.

The non-refillable valve taught by van der Sanden, although offering manufacturing advantages over the prior art valve designs known at that time, still requires the use of a complex and relatively costly manufacturing process, for specific reasons described immediately hereinafter; and suffers from certain performance limitations as well, also described immediately hereinafter.

In particular, the valve housing described by van der Sanden requires the formation of manufactured undercuts or "blinds" in order to function properly. For example, the undercut shown at location 37 in FIG. 1 of the incorporated patent to van der Sanden (where the central core of the valve shown in FIG. 1 is wider immediately below location 37 than it is immediately above that location), is a requirement for practicing the referenced invention and adds complexity and expense to the valve housing manufacturing process.

Furthermore, according to van der Sanden's teachings, the blocking element is "directional", that is, it needs to be carefully inserted in the proper direction during the manufacturing process for the valve to work at all.

Further still, the valve taught by van der Sanden requires the blocking element, in all of the various embodiments set forth in the reference, be held in its initial position (to facilitate initial charging of the container), by a connection of the blocking element to a stem, rod or some other valve component; or makes the operation of the blocking element dependent on the proper operation of another movable internal valve component, such as a slideable rod, etc., for its proper positioning. Steps such as these further complicate the valve manufacturing process. Operationally, this requirement also introduces a potential performance limitation affecting valve reliability since blocking element linkage with or dependency on other valve components becomes a factor in achieving valve reliability.

A blocking element that does not need to be connected to a stem, rod or some other internal valve component; or otherwise depend on the operation of another movable internal valve component, such as a slideable rod, etc., for its proper positioning, is defined herein to be a "freestanding" blocking element (or check).

Still further, by using the type of blocking device specifically called for by van der Sanden (having at least one flexible, radially extending arm, without further limitation), the referenced valve runs the risk of having its one way feature inadvertently activated during assembly, i.e., causing a false engagement of the blocking device during the valve assembly process. This undesirable result can occur if the blocking element traverses too far down the central bore of the valve during the assembly process (typically involving the insertion of other valve components on top of the blocking element or screwing in of a valve control mechanism to which the blocking element is attached, etc.). Such an event may occur in a valve like van der Sanden's that features a flexible blocking element having radially expanding arms as a main attribute. The use of such arms, without further structural limitations, teaches away from providing a sufficiently rigid blocking element having the structural integrity to, for example, prevent an arm from snapping off under mechanical pressure, or for preventing the passage of the blocking element past a predetermined point without the exertion of a predetermined amount of driving force, etc.

With respect to the incorporated O'Connor patent, a non-refillable valve which differs in many important respects from the teachings of van der Sanden is described. For example, the O'Connor valve uses pressure instead of a mechanical force to release the primary valve seal; O'Connor utilizes the same element for making a primary valve seal when closing the valve as is used (i.e., the element doubles as) the blocking element, etc. However, many of the same problems inherent in manufacturing a non-refillable valve are common to both van der Sanden's teachings and those of O'Connor such as, for example, the requirement that the valve housing used have manufactured undercuts, the blocking element used is still "directional", i.e., it needs to be carefully inserted in the proper direction during the manufacturing process for the valve to work, the blocking element is not "freestanding", as defined hereinabove, etc.

Still other problems related to prior art valve designs, blocking elements used in non-refillable valves and the known valve manufacturing processes themselves, exist.

Examples stated in terms of the needs that result from such problems include: (a) the need for a dual purpose manufacturing process that uses a single basic valve design to enable both refillable and non-refillable valves to be manufactured using essentially the same parts list, machine tools, etc.; instead of the present practice of having to execute dedicated manufacturing process for producing refillable versus non-refillable type valves (because of differing housing types that are used, different components required for valve operation, etc.); (b) the need for a valve design (both refillable and non-refillable) that utilizes a mechanically operated primary sealing mechanism (as opposed to valve designs that utilize a pressure differential to open the primary sealing mechanism) to insure seal quality while solving the other problems with known valves indicated hereinabove; (c) the need for a valve design that prevents rotation of the primary sealing mechanism in the valve housing to minimize wear, extend valve life and further improve seal quality; (d) the need for a valve design in which the primary sealing mechanism and means for controlling the opening and closing of the valve are optionally made from discrete components formed from different materials to enable the sealing mechanism to be chemically compatible with the fluid contents of the container even when the controlling mechanism (means for controlling the opening and closing of the valve) is not; and (e) the need for a valve design, solving all of the aforementioned problems and meeting the aforestated needs, which is relatively simple and inexpensive, which will allow normal filling of the pressure container under proper conditions, adequate sealing of the pressure during nonuse, selective discharge of the pressure container and, in the case of the non-refillable valves contemplated by the invention, provide effective protection and prevention against improper and unauthorized filling of the container.

Accordingly, for all of the reasons stated hereinbefore, it would be desirable if methods and apparatus relating to valves for pressurized containers were available for providing (a) valves having a "unidirectional stepped" valve housing, defined herein as a valve housing that includes a central bore having two or more stepped portions each radially increasing (or conversely decreasing) as the bore is traversed in a given direction. A unidirectional stepped valve housing would not require manufactured undercuts or inserted components to properly function; as opposed to prior art valve designs (exemplified hereinbefore with reference to the incorporated patents) which require the formation of "blinds", etc.; (b) non-refillable valves which include a "reversible check" (a blocking element), i.e. a check that can be installed in the aforementioned valve housing in either of two directions for proper valve operation; as opposed to prior art non-refillable valves that utilize directional checks (it should be noted that a symmetrical reversible check would be even more desirable to further simplify the manufacturing and installation process and accordingly is preferred); (c) non-refillable valves which include a "freestanding" check (as defined hereinbefore) to simplify the valve manufacturing process further (by eliminating assembly steps), enhance valve reliability (by minimizing the number of required actions for the valve to work), lower valve and check manufacturing costs, etc.; and (d) non-refillable valves which include a check that integrally incorporates a "deformable" member (blocking element, check, stop means, etc.), as defined hereinafter, which automatically operates to prevent the return of the check to an initial location upon movement of the blocking element from the initial location to a final location (thereby activating the one way feature of the valve); and which is designed to inherently reduce the risk of false check engagement during the valve assembly process, an event that would improperly activate the one way feature of the valve and not allow the container to be initially charged.

A "deformable" member (blocking element, check, stop means, etc.) is defined herein as a member which changes shape under the influence of a predetermined amount of force required to drive the member through an opening; but which is relatively rigid when not under the influence of the predetermined amount of force in order to withstand the premature forcing of the member through the opening. Such member would also preferably possess a predefined degree of structural integrity that in addition to inhibiting false engagement, tends to prevent pieces of the member from breaking when the member is being driven or otherwise forced through the opening.

Furthermore, it would be desirable to provide: (a) blocking elements (checks) per se, for use in non-refillable valves, which are easy to manufacture and install, which inherently reduce the risk of false check engagement during the valve assembly process, and possess the other characteristics of desirable checks referred to hereinabove (such as being reversible, symmetrical, etc.); (b) a dual purpose manufacturing process of the type referred to hereinabove, for manufacturing both refillable and non-refillable valves; (c) a valve design that utilizes a mechanically operated primary sealing mechanism to insure seal quality and prevents rotation of the primary sealing mechanism in the valve housing to minimize wear, extend valve life and further improve seal quality to meet the need for these features set forth hereinbefore; (d) a valve design in which the primary sealing mechanism and means for controlling the opening and closing of the valve are optionally made from discrete components for the reasons stated hereinbefore; and (e) a valve design that incorporates the other desirable features set forth hereinabove and yet remains relatively simple and is inexpensive to produce.

SUMMARY OF THE INVENTION

Accordingly, it is an object of the invention to provide a single basic valve design that may be used for manufacturing both refillable and non-refillable valves using essentially the same parts list, machine tools, etc., wherein the design incorporates a unidirectional stepped valve housing as defined hereinbefore.

Furthermore, it is an object of the invention to provide a non-refillable valve design that incorporates a reversible check, as defined hereinbefore, to simplify the valve design and check installation process.

It is still a further object of the invention to provide a non-refillable valve design that incorporates a symmetrical reversible check to once again simplify the valve design and check installation process.

Still further, it is an object of the invention is to provide a non-refillable valve design that incorporates a freestanding check, as defined hereinbefore, to minimize the number of required valve manufacturing assembly steps, enhance valve reliability by minimizing the number of required actions for the valve to work, lower valve and check manufacturing costs, etc.

Another object of the invention is to provide a non-refillable valve design that incorporates a check which integrally incorporates a deformable member, as defined hereinbefore, which automatically operates to prevent the return of the check to an initial location upon movement of the blocking element from the initial location to a final location (thereby activating the one way feature of the valve); and which is designed to inherently reduce the risk of false check engagement during the valve assembly process.

Yet another object of the invention is to provide blocking elements (checks) per se, for use in non-refillable valves, which are easy to manufacture and install, which inherently reduce the risk of false check engagement during the valve assembly process, and which possess the other characteristics of desirable checks referred to hereinabove (such as being reversible, symmetrical, etc.).

Further objects of the invention include providing a valve design that (a) utilizes a mechanically operated primary sealing mechanism to insure seal quality; (b) prevents rotation of the primary sealing mechanism in the valve housing to minimize wear, extend valve life and further improve seal quality; (c) optionally incorporates discrete components made of differing materials for realizing the primary sealing mechanism and means for controlling the opening and closing of the valve, to enable the sealing mechanism to be chemically compatible with the fluid contents of the container event when the controlling mechanism is not; and (d) is relatively simple and inexpensive, which will allow normal filling of the pressure container under proper conditions, adequate sealing of the pressure during nonuse, selective discharge of the pressure container and, in the case of the non-refillable valves contemplated by the invention, provide effective protection and prevention against improper and unauthorized filling of the container.

The objects of the invention are achieved in part by providing a non-refillable valve for a pressurized container that includes a blocking element adapted to occupy an initial location, in which fluid can move in and out of the container past the blocking element, where the valve and blocking element are further configured such that the blocking element can be irreversibly moved to a position in which the valve permits escape of fluid under pressure exerted from the inside of the container, but which automatically closes in response to exposure to an external pressure greater than the pressure inside the container.

According to a preferred embodiment of the invention, the valve itself comprises a unidirectional stepped valve housing and means for controlling the opening and closing of the valve, for example, a stem. Furthermore, according to the preferred embodiment of the invention, the valve comprises a valve body (also referred to herein as the valve's primary sealing mechanism) that is used in combination with the stem as a mechanism for driving the blocking element (check) to the position described hereinbefore in which the valve is operative to permit escape of fluid under pressure exerted from the inside of the container; but which automatically closes in response to exposure to an external pressure greater than the pressure inside the container (after initial charging). In other words, the stem and valve body combination is used to force the blocking element from its initial position to its final location afterwhich the one way feature of the valve is activated.

According to one specific aspect of the invention a non-refillable valve for a pressurized container is described comprising a blocking element adapted to occupy an initial location whereby fluid can move in and out of the container past the blocking element, the valve and blocking element being further configured such that the blocking element can be irreversibly moved to a final location in which the valve permits escape of fluid under pressure exerted from the inside of the container, but which automatically closes in response to exposure to an external pressure greater than the pressure inside the container, the blocking element comprising a reversible check that integrally includes stop means for preventing the return of the blocking element to the initial location upon movement of the blocking element from the initial location to the final location.

According to alternate embodiments of the invention, a non-refillable valve is described as including a check characterized as freestanding; both freestanding and reversible; and in the case of a reversible check, an optional (and preferred) characterization is that the check be symmetrical, i.e., the reversible ends of the check have the same shape.

Further aspects of the invention are directed to blocking elements per se for use in non-refillable valves. These blocking elements may alternatively be characterized as comprised of reversible checks, symmetrical checks, freestanding checks, checks including deformable stops (as described hereinbefore), etc. Further check embodiments are set forth which include means for centering the check when installed in the valve housing, various means which inhibit false check engagement and add structural rigidity to the checks for reasons discussed hereinbefore, etc.

The invention is also directed to a manufacturing process for fabricating both refillable and non-refillable valves for pressurized containers, comprising the steps of: (a) fabricating a unidirectional stepped valve housing, wherein the housing comprises a central bore that includes an upper portion, lower portion and a middle portion located therebetween, wherein the lower portion is narrower than the middle portion which in turn is narrower than the upper portion; (b) fabricating a port in the middle portion of the housing to facilitate connection of a nozzle thereto; (c) securing the valve housing to the container such that the lower portion of the central bore is in fluid communication with the interior of the container; (d) fabricating means for controlling the opening and closing of the valve and an associated valve body component for making a primary valve seal when the valve is closed; (e) inserting a blocking element comprising a freestanding check into the housing, whenever the valve is to be used as a non-refillable valve, such that the blocking element is centered within and rests in the lower portion of the central bore in proximity to the container; (f) installing the means for controlling and the associated valve body component into the housing, such that the valve body component is located after installation within the middle portion of the central bore and the means for controlling is located after installation at least in part within the upper portion of the central bore; and (g) securing the combination of the means for controlling and the associated valve body component, together with the blocking element whenever a blocking element is inserted into the housing in step (e), within the housing.

The non-refillable valves contemplated by a preferred embodiment of the invention feature: (a) a unidirectional stepped valve housing; (b) the use of an easy to install, reversible, symmetrical check that (once installed) is freestanding; and furthermore, according to the invention, such check integrally incorporates deformable stop means which is automatically operative to prevent the return of the check to an initial location upon movement of the blocking element from the initial location to a final location, with the check being further designed to inherently reduce the risk of false check engagement during the valve assembly process.

Further features of the invention include the provision of a dual purpose manufacturing process that uses a single basic valve design to enable both refillable and non-refillable valves to be manufactured using essentially the same parts list, machine tools, etc.; a valve design (both refillable and non-refillable) that utilizes a mechanically operated primary sealing mechanism and prevents rotation of the primary sealing mechanism in the valve housing (for the reasons previously stated herein), and a valve design that meets all of the other needs for and objects of the invention set forth hereinbefore.

These and other objects, embodiments and features of the present invention and the manner of obtaining them will become apparent to those skilled in the art, and the invention itself will be best understood by reference to the following Detailed Description read in conjunction with the accompanying Drawing.

DETAILED DESCRIPTION

A non-refillable valve of the type contemplated by one aspect of the invention will first be described with reference to FIGS. 1–4. This is followed by a description of several embodiments of blocking elements contemplated by another aspect of the invention. Three exemplary blocking element embodiments are described with reference to FIGS. 5–7. Finally, a description of manufacturing processes contemplated by the invention is set forth with reference to the exemplary manufacturing process depicted in FIG. 8.

Figure 1:
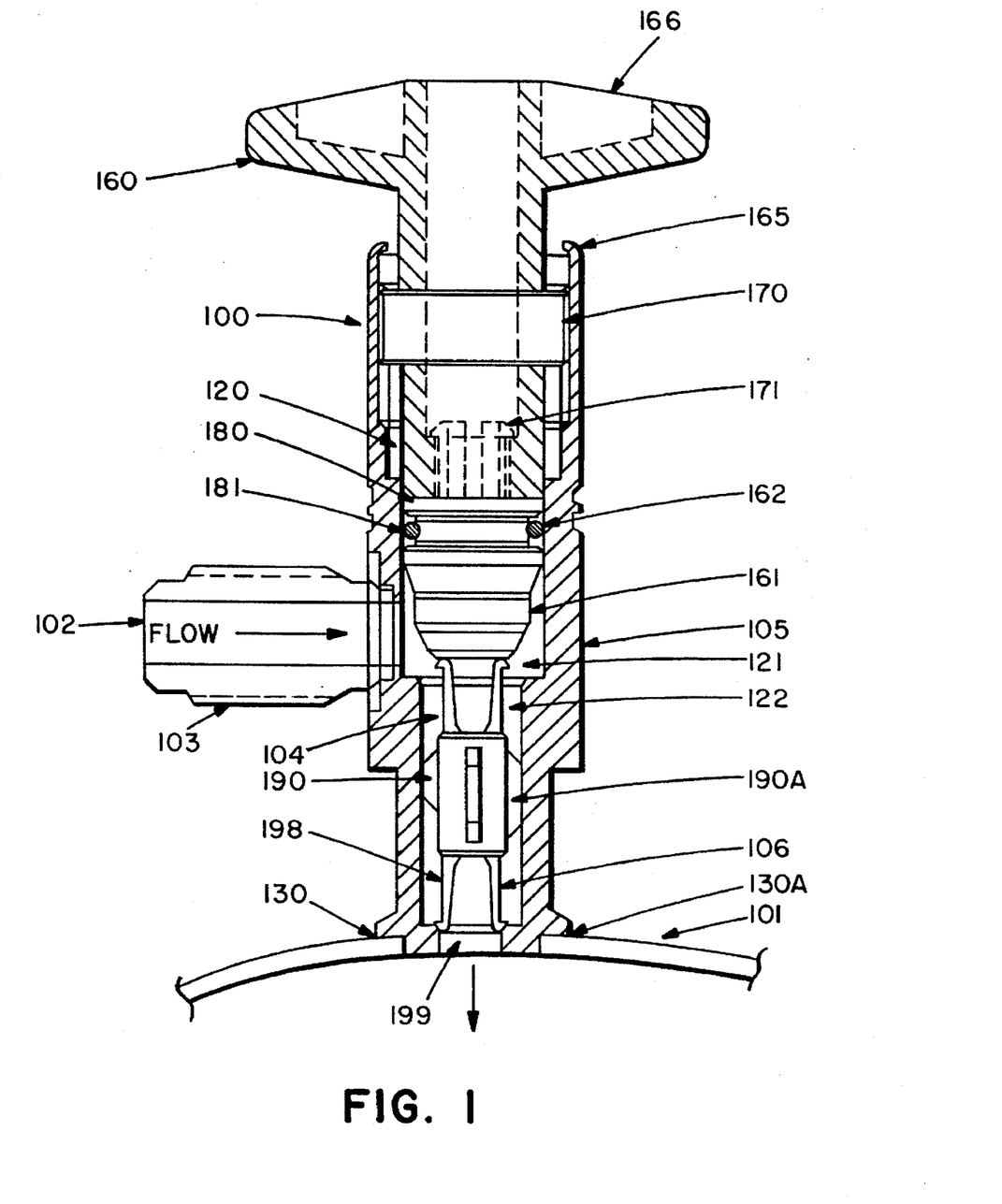
FIG. 1 is a longitudinal cross-sectional view of a non-refillable valve, of the type contemplated by one aspect of the invention, in its filling position.

As indicated hereinabove, FIG. 1 is a longitudinal cross-sectional view of a non-refillable valve (valve 100), of the type contemplated by a first aspect of the invention, in a "filling position". In the filling position valve 100 permits the initial charging of container 101, also shown in FIG. 1, with fluid from a fluid source (not shown) that may be introduced into container 101 via, for example, passageway (port) 102 through nozzle 103.

Passageway 102 is shown in FIG. 1 to be in fluid communication with the interior portion of container 101 via central bore 104 in valve housing 105. The arrow depicted in container 101 indicates that the direction of fluid flow in FIG. 1 is into container 101.

Figure 4:
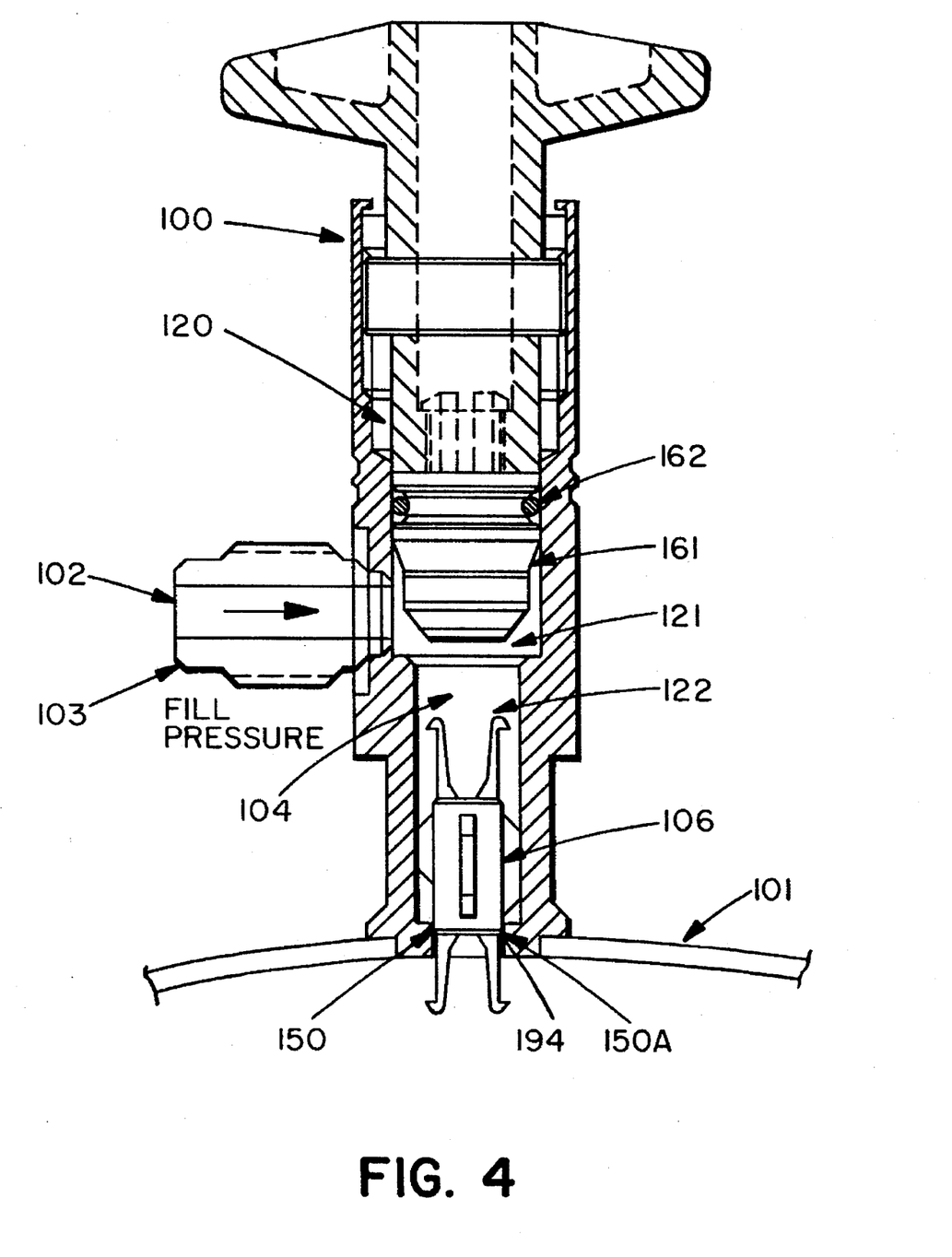
FIG. 4 is a longitudinal cross-sectional view of the non-refillable valve shown in FIG. 1 in the position assumed by such valve when a refill is attempted at any time after the authorized initial charging of the container.
Figure 5:
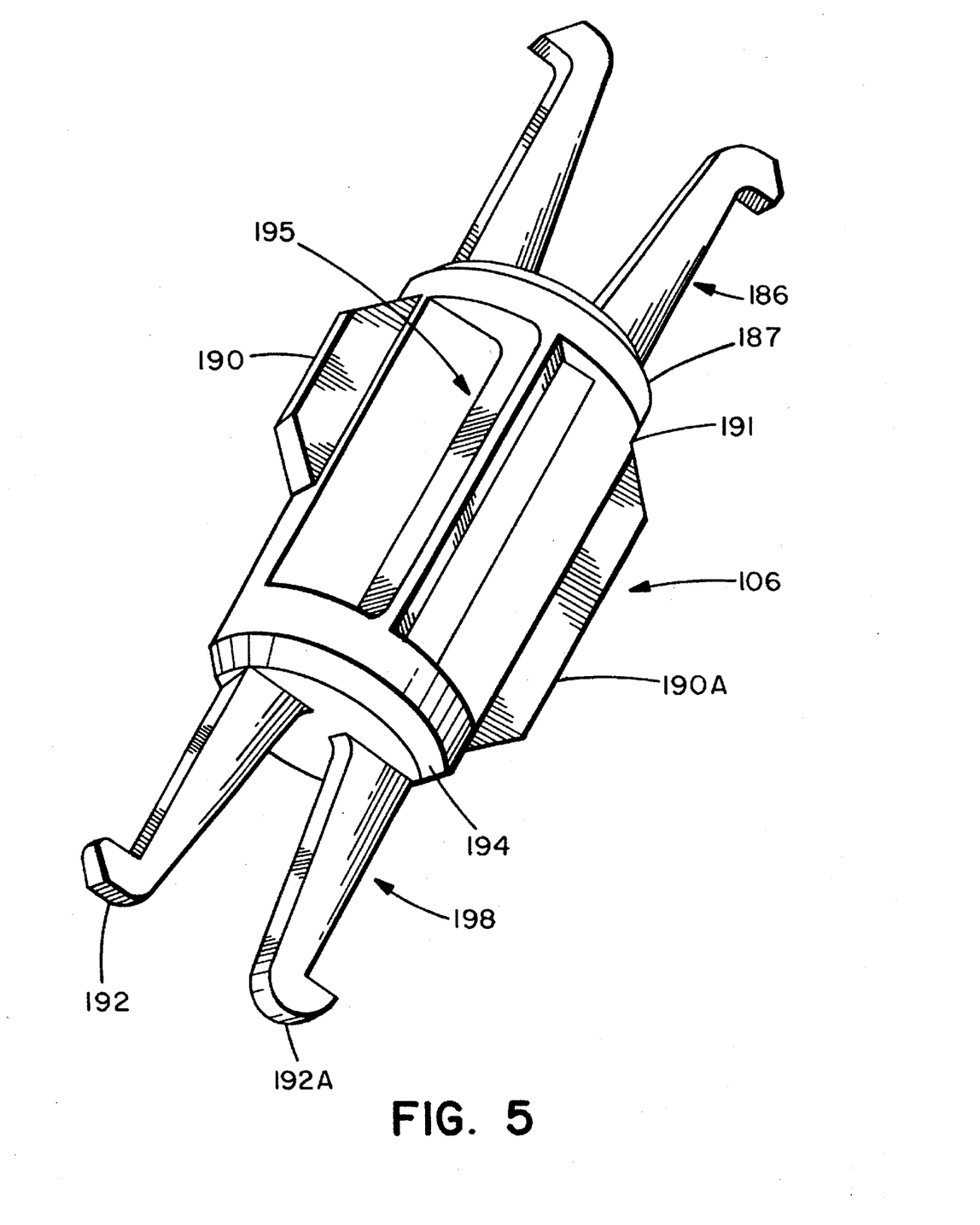
FIG. 5 illustrates a perspective view of a check contemplated by one embodiment of another aspect of the invention, which may be used in a non-refillable valve of the type depicted in FIGS. 1–4 (the check in FIG. 5 is shown as the same type of check depicted in FIGS. 1–4).

That a fluid path actually exists between passageway 102 and the interior of container 101, will become apparent to those skilled in the art after studying the perspective drawing of illustrative blocking element 106 shown in FIG. 5 depicting the same check shown in FIG. 1. In particular, with reference to FIG. 5, it may be seen that, for example, vanes 190 and 190a (formed as part of check body 191 and used to center blocking element 106 when installed in valve housing 105 as is explained further hereinafter); together with the recesses (like recess 195) in check body 191, form a passageway in valve housing 105 through which fluid can flow between central core 104 and the interior of container 101. This passageway is open so long as check 106 (in particular sealing portion 194 on the end of check 106 assumed, for the sake of illustration only, to be inserted first when installed in valve housing 105) is not seated on seat portions 150 and 150a of housing 105 (shown in FIG. 4 and described in detail hereinafter).

In fact, blocking element 106 is designed to allow container 101 to be filled prior to the one way feature of valve 100 being activated; prevent refilling thereafter; and as shown incorporates the reversible, preferably symmetrical, freestanding (when inserted in valve housing 105) and deformable stop features, all discussed hereinbefore. All of these features will become apparent from the detailed description of the invention that follows when read in conjunction with the Drawing.

It should be noted that central bore 104 in valve housing 105 has three distinct portions depicted in each of FIGS. 1–4: upper bore portion 120, middle bore portion 121 and lower bore portion 122. It should be further noted that, in accordance with the preferred embodiment of the invention, valve housing 105 is a unidirectional stepped valve housing as previously defined herein (i.e., a valve housing that includes a central bore having two or more stepped portions each radially increasing (or conversely decreasing) as the bore is traversed in a given direction).

In particular, traversing the valve from top to bottom, the radius of upper valve portion 120 can be seen to be greater than the radius of middle valve portion 121; and the radius of middle valve portion 121 can in be seen to be greater than the radius of lower valve portion 122. This design, for the reasons explained hereinbefore, is advantageous for valve manufacturing purposes.

Figure 2:
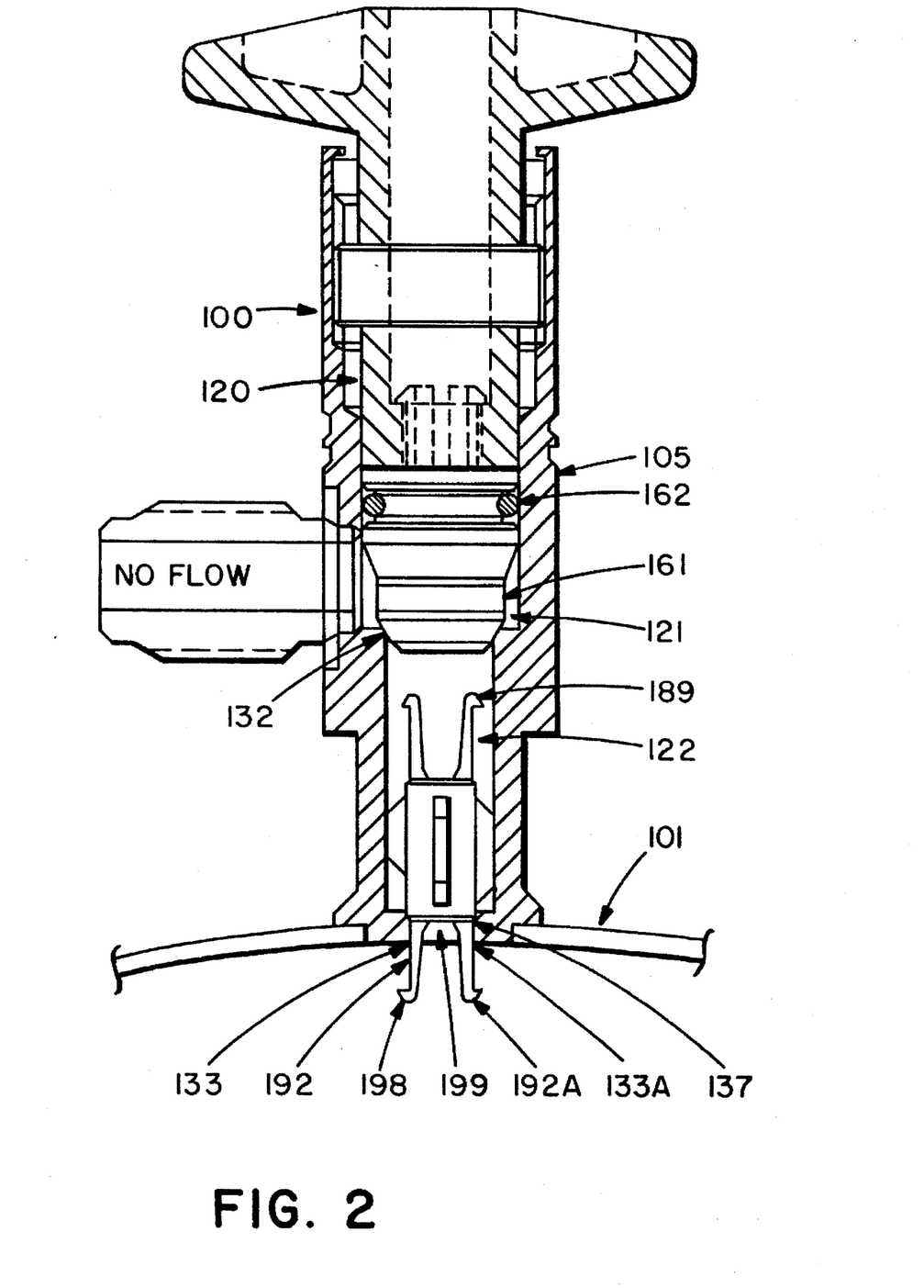
FIG. 2 is a longitudinal cross-sectional view of the non-refillable valve shown in FIG. 1 in its closed position, ready for use.

FIG. 2 depicts, as indicated hereinbefore, a longitudinal cross-sectional view of valve 100 in its closed position, ready for use after container 101 is initially charged with fluid and closed for the first time. No fluid is flowing when valve 100 is in the closed position shown in FIG. 2.

Figure 3:
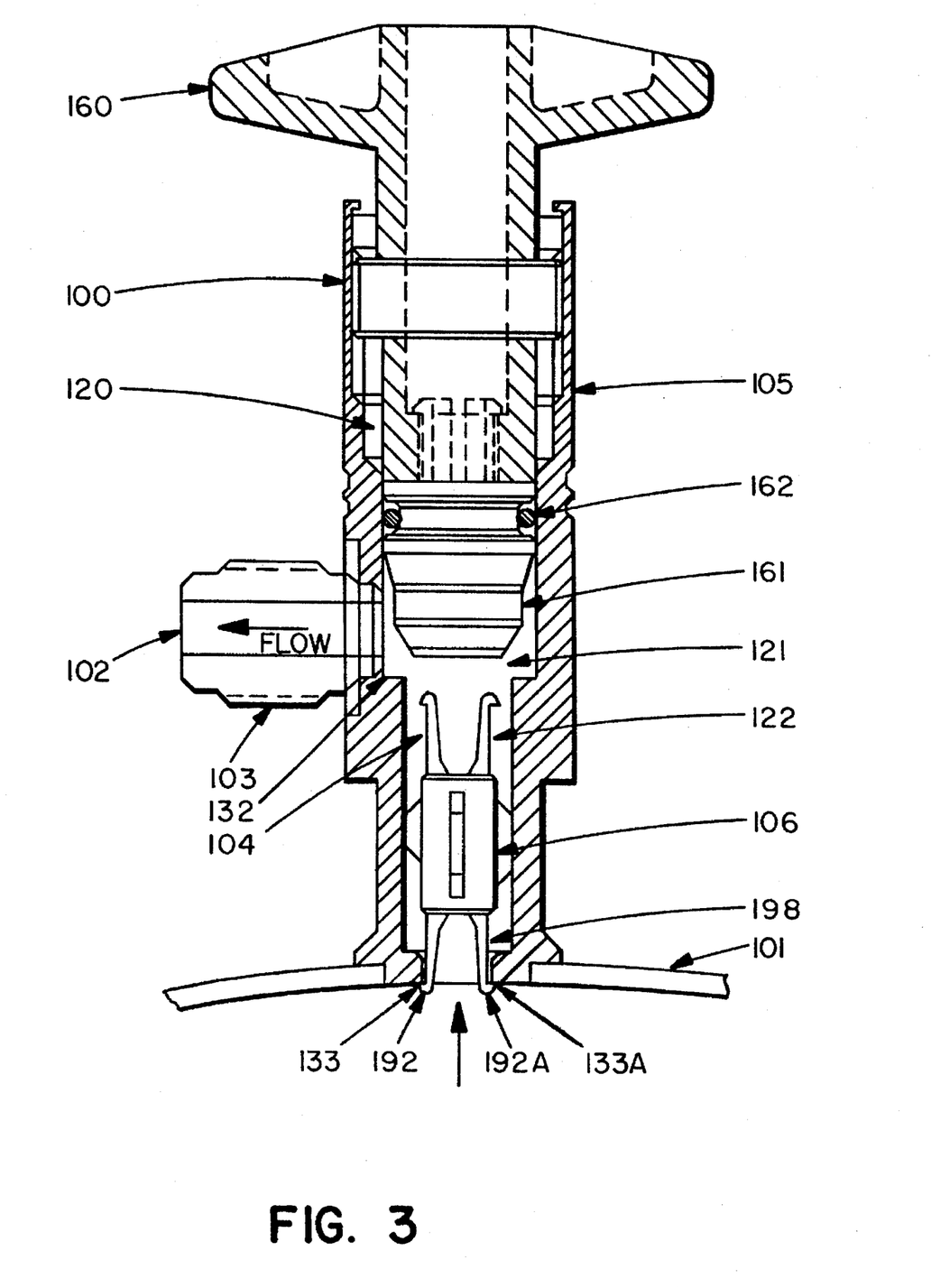
FIG. 3 is a longitudinal cross-sectional view of the non-refillable valve shown in FIG. 1 in an open position that facilitates discharge of the contents of the container to which the valve is attached.

FIG. 3 depicts, as indicated hereinbefore, a longitudinal cross-sectional view of valve 100 in an open position. The arrow depicted in container 101 indicates that the direction of fluid flow in FIG. 3 is out of container 101, into central bore 104 in valve housing 105, and eventually out of passage way 102 through nozzle 103.

FIG. 4 depicts, as indicated hereinbefore, a longitudinal cross-sectional view of valve 100 in a "non-refill" position., i.e., a position in which blocking element (check) 106 makes contact with the seat (shown at 150 and 150a in FIG. 4) in the lower portion of central bore 104 to thereby prevent fluid from flowing into container 101. No fluid is flowing through valve 100 into container 101 even when a fluid source is connected to passageway 102 of nozzle 103 as is indicated on FIG. 4. This illustrates the one way feature of valve 100 at work, i.e., when valve 100 is in the non-refill position depicted in FIG. 4.

Non-refillable valve 100, as depicted in FIGS. 1–4 in its various positions, is intended as a replacement for existing valves used in the one-way cylinder market, in particular those existing valves that rely on pressure to open the valve seat (as described hereinbefore with reference to the incorporated O'Connor patent); those existing valves which rotate the stem seal in the bore, adding friction to the opening/closing sequence; and those other valves and valve components which suffer from the various shortcomings related to their overall design and related manufacturing processes as described in detail in the previously set forth Background of The Invention.

Valve 100 will now be described in detail with reference to FIGS. 1–4.

Non-refillable valve 100 is shown in each of FIGS. 1–4 to be permanently attached to a cylinder, like exemplary container 101, expressly intended for a one fill opportunity. The attachment is typically performed by welding valve housing 105 to container 101 in the area marked 130 and 130a in FIG. 1 during a valve manufacturing process, such as the valve manufacturing process contemplated by that aspect of the invention described hereinafter with reference to FIG. 8.

The valve 100 and container 101 combination depicted in FIG. 1 is typically shipped to an authorized filler in the fill position illustrated in FIG. 1. When closed for the first time, the non-refillable feature is activated. The end user will only be able to discharge the cylinder contents with no refill opportunity being possible.

Exemplary non-refillable valve 100 as shown in FIG. 1 is comprised of main five components: t-stem 160 (illustrative means for controlling the opening and closing of valve 100); valve body 161 (illustrative means for making the primary valve seal) which, for the reasons stated hereinbefore, may optionally (and preferably) be fabricated separately with respect to t-stem 160 (and even from a different material if desirable); blocking element (check) 106, which preferably has all (or at least some) of the desirable check attributes discussed hereinbefore (such as being reversible, preferably symmetrical, freestanding when inserted into valve 100, etc.); unidirectional stepped valve housing 105 which encloses all valve components and, as indicated hereinabove, is attached to container 101; and sealing means (such as o-ring seal 162), all depicted in FIG. 1.

Again, as indicated hereinbefore, t-stem 160 is used, according to a preferred embodiment of the invention, to control the opening and closing of the non-refillable valve.

Valve body 161 in FIG. 1 is designed to make the primary valve seal when valve 100 is closed. Those skilled in the art will readily appreciate that alternative valve body shapes may be employed for the same purpose (making the primary valve seal) depending on the location of nozzle 103 and the interface between the passageway therethrough and central bore 104, etc. The depicted shape is not intended to limit the scope of the invention; but rather illustrate a suitable valve body shape for effecting the primary valve seal for exemplary valve 100 being described with reference to FIGS. 1–4.

Valve body 161 also makes the stem seal when the valve is open. For example (and for the sake of illustration only), o-ring 162 is shown held in place by valve body 161 and is used to effect the stem seal as depicted in each of FIGS. 1–4 (where o-ring seal 162 is shown held by valve body 161 against the interior surface of middle portion 121 of central bore 104).

According to the illustrative embodiment of the invention being described with reference to FIG. 1, all valve components are held inside valve housing 105 by a permanent swage to the end of valve housing 105 (shown at 165 in FIG. 1). The valve is opened and closed by rotating the handle of t-stem 160 shown at 166 in FIG. 1.

According to a preferred embodiment of the invention, t-stem 160 rotation is translated to an axial motion within the valve housing 105 via screw threads 170. Furthermore, according to a preferred embodiment of the invention, valve body 161 and t-stem 160 are attached by snap-fit 171. This attachment (as well as others that may be devised by those skilled in the art) provides a mechanical means to open the valve, as opposed to pressure differential alone. Snap-fit coupling 171 depicted in FIG. 1 is, according to a preferred embodiment of the invention, fabricated as part of valve body 161; however, no such limitation is implied inorder to practice the invention.

Although the preferred embodiment of the invention calls for a separate means for controlling the opening and closing of the valve being attached to a separate valve body component, this preferred arrangement (preferred for taking maximum mechanical advantage of the threaded engagement between t-stem 160 and screw threads 170, allowing for use of differing materials when forming the preferred discrete components for purposes such as chemical compatibility with fluid contents of the container, etc., as alluded to hereinbefore), is not required to practice the invention.

It should also be noted that the aforementioned attachment is designed so that the friction between t-stem 160 and valve body 161 (at exemplary contact location 180 in FIG. 1) is less than friction between o-ring sealing means 162 and valve housing 105 at illustrative contact location 181 on the interior surface of central bore 104 in valve housing 105. This frictional force arrangement prevents rotation of the valve body 161 in central bore 104 which, as those skilled in the art will readily appreciate, extends the resealing capability of valve 100 and improves the sealing performance of the aforementioned stem seal. A non-rotating seal (stem seal) also allows a more accurate opening and closing torque to be applied to t-stem 160 as well.

Making further reference to FIG. 1, it may be seen that when container 101 is being filled through a passageway (port) 102, check 106 is located in the lower portion of central bore 104. The illustrative symmetrical check depicted (check 106), allows for its insertion in either direction to simplify assembly (i.e., the check is reversible; although the invention does not require that the check be symmetrical or even reversible in alternate embodiments); the check is freestanding (as defined hereinbefore); and the check is further shown to include deformable member 198 (sometimes referred to herein as a stop means that includes at least one deformable member). Deformable member (or stop) 198 is, according to a preferred embodiment of the invention, intentionally designed to resist the pressures generated during the filling of container 101, pressures exerted when assembling the valve (when positioning valve body 161 in proximity to check 106 as shown in FIG. 1) and pressures exerted when attempting to force (or drive) check 106 at least in part through opening 199 into container 101 to activate the non-refillable feature of the invention. This intentional rigidity is designed into deformable member 198 so that it does not break or prematurely deform when experiencing the aforementioned pressures.

Finally, with reference to FIG. 1, it should be noted that vanes functioning as indicated hereinbefore (formed as a part of check 106 and designed to keep the check centered in valve housing 105, allow for fluid passage, etc., like vanes 190 and 190a shown in FIG. 5) are also shown in FIG. 1 at 190 and 190a.

Reference should now be made to FIG. 2 which, as indicated hereinbefore, depicts a longitudinal cross-sectional view of valve 100 in its closed position and ready for use.

During initial closure of valve 100, valve body 161 (placed prior to initial closure in proximity to with check 106 as indicated hereinabove) is intended to make contact with the upper portion of check 106 (shown in FIG. 2 as check portion 189), with the further aforementioned intention of driving the depicted deformable member 198 (with portions thereof shown at 192 and 192a in FIG. 2), at least in part, past stop seat 137 in valve housing 105 (shown in both FIG. 1 and FIG. 2), and through opening 199 into container 101. This will enable the non-refillable feature of the valve as should now be apparent to those skilled in the art.

With further reference to FIG. 2 it may be seen that the primary valve seal is made by contact between valve body 161 and valve housing 105 at contact location 132 indicated in FIG. 2; and that portions of deformable member 198 (shown as portions 192 and 192a in FIG. 2), are shown designed to engage valve housing 105 at locations 133 and 133a, respectively, when check 106 experiences back pressure from the fluid in container 101. This situation occurs valve 100 is opened as shown in FIG. 3, with FIG. 3 actually depicting portions 192 and 192a of deformable member 198 engaging valve housing 105 at locations 133 and 133a, respectively, when valve 100 is open.

Further reference should now be made to FIG. 3 which, as indicated hereinbefore, depicts a longitudinal cross-sectional view of a non-refillable valve 100 in an open position that facilitates discharge of the contents of the container to which the valve is attached.

Removing contents of container 101 is, according to the teachings of the invention and again with reference to FIG. 3, accomplished by rotating t-stem 160 (for example, counter-clockwise if screw threads 170 are formed appropriately in valve housing 105); which breaks the contact between valve body 161 and valve housing 105 at previously indicated contact location 132. When this occurs (i.e., when the primary valve seal is opened), check 106 floats with the flow of the contents from container 101, allowing the contents of container 101 to be discharges through nozzle 103 and passageway 102 therethrough, with check 106 engaging valve body 105 as described previously with reference to FIG. 3.

To complete the description of the operation of the exemplary non-refillable valve contemplated by the invention, reference should be made to FIG. 4 which, as previously indicated, depicts a longitudinal cross-sectional view of a valve 100 in the position assumed by such valve when a refill is attempted at any time after the authorized initial charging of container 101. Any attempt to refill the container 101 is prevented by the aforementioned seal portion 194 of check 106 (more clearly shown in FIG. 5) making contact with the seat (shown at 150 and 150a in FIG. 4) in the lower portion of central bore 104.

Figure 6:
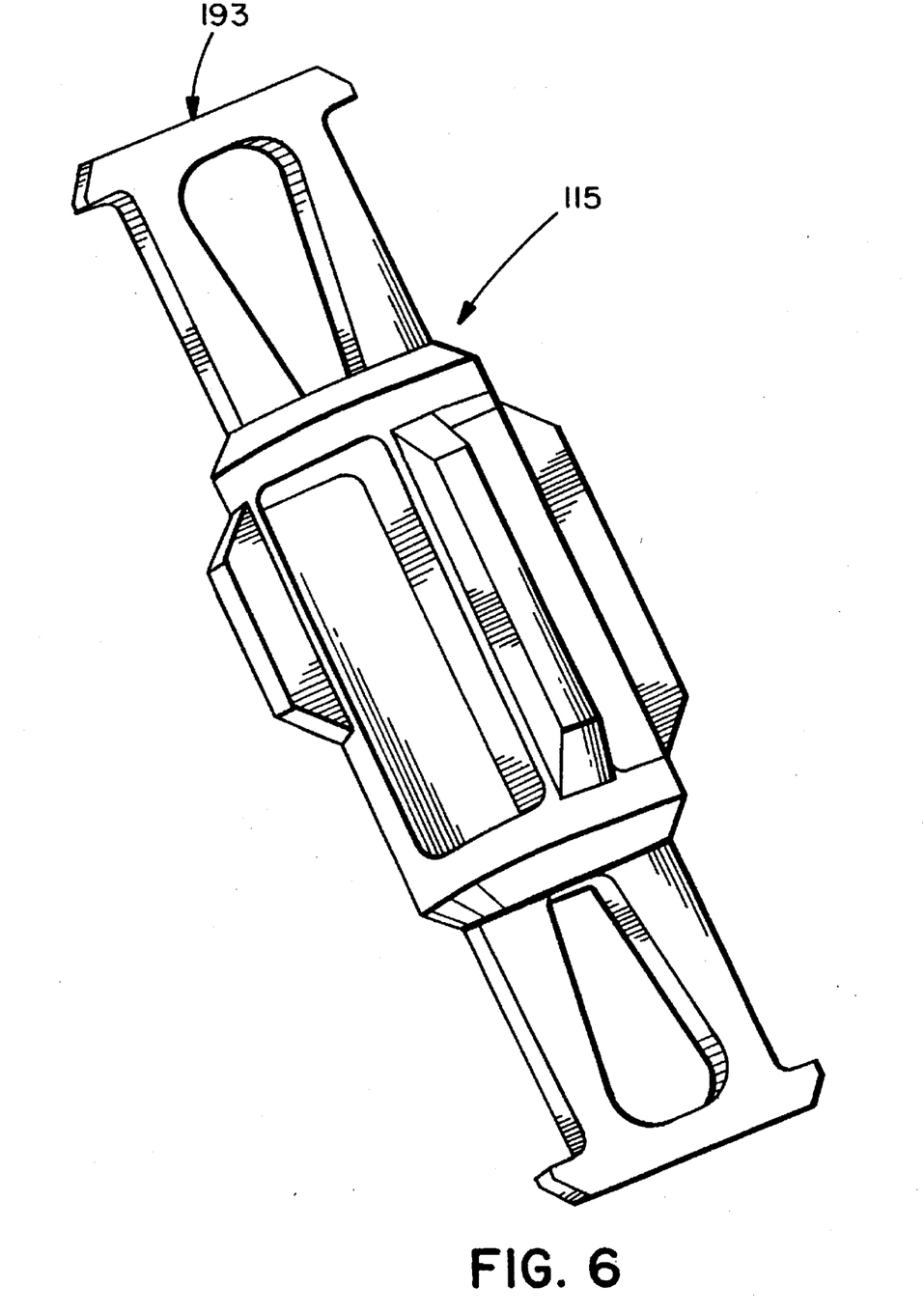
FIG. 6 illustrates a perspective view of a check contemplated by an alternate embodiment of the check depicted in FIG. 5, featuring the use of a "cross bar" stabilizer to enhance check rigidity, the check's ability to function as a freestanding element once inserted into a valve housing and enhance the false engagement protection feature of the depicted check.
Figure 7:
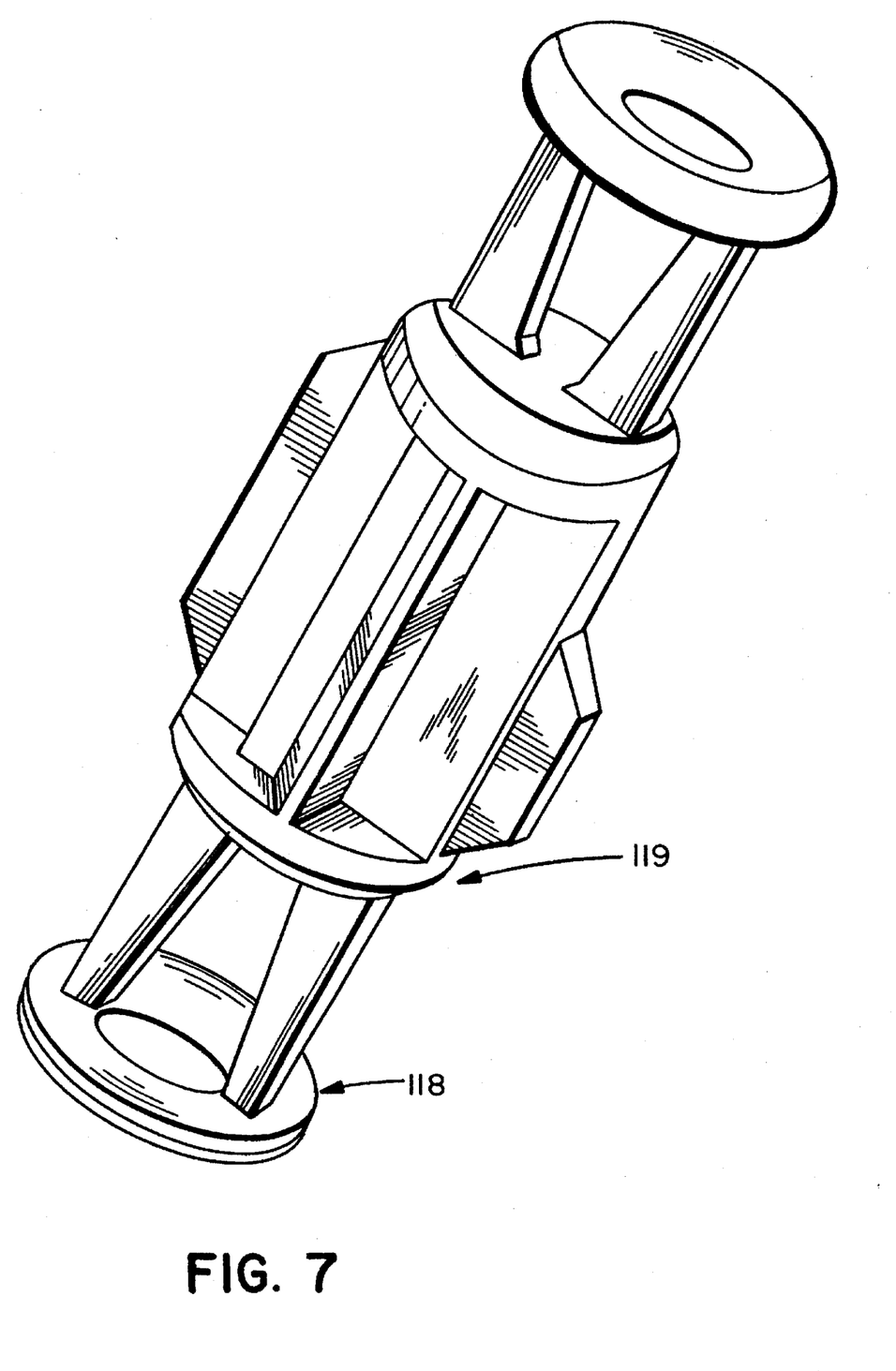
FIG. 7 illustrates a perspective view of a check contemplated by yet another alternate embodiment of the checks depicted in FIGS. 5–6, featuring the use of an "annular ring" stabilizer to enhance check rigidity, the check's ability to function as a freestanding element once inserted into a valve housing and enhance the false engagement protection feature of the depicted check.

Reference should now be made to FIGS. 5-7 so that exemplary alternative embodiments of checks contemplated by the invention (as illustrated in FIGS. 6-7), for use with the novel non-refillable valve design set forth hereinbefore, can be compared with the previously described check depicted in FIG. 5.

First, with reference to FIG. 5, it should be recalled that depicted check 106 is shown to include vanes 190 and 190a, and recesses like recess 195, both formed in check body 191 as previously described, for centering check 106 and providing passages for fluid flow when appropriate.

Furthermore, FIG. 5 is shown to include previously described deformable member 198 (having depicted portions 192 and 192a, also described hereinbefore); where, in the example depicted in FIG. 5, check 106 is both reversible and symmetrical.

In particular, it should be noted that deformable member 198, shown as a radially extending deformable member (actually a radially extending pair of arms is shown in FIG. 5), is identical to deformable member 186 at the top of FIG. 5; and that sealing portion 194 of check 106 is identical to sealing portion 187 of check 106. This is in accord with the preferred embodiment of the invention for the reasons stated hereinbefore; although not required to practice every embodiment of the invention anticipated by the teachings herein.

Further yet, it should be recalled that deformable member 198 (and corresponding deformable member 186 shown in FIG. 5) are, according to a preferred embodiment of the invention, intentionally designed to resist the pressures generated during the filling of container 101, pressures exerted when assembling the valve (when positioning valve body 161 in proximity to check 106 as shown in FIG. 1) and pressures exerted when attempting to force (or drive) check 106 at least in part through opening 199 into container 101 to activate the non-refillable feature of the invention. Unlike the prior art, this intentional rigidity is designed into, for example, deformable member 198, so that it does not break when experiencing the aforementioned pressures; and so that the check inherently posses a sufficient amount of structural rigidity to function properly as a freestanding element (for example, it doesn't flex to easily and collapse so as to be prematurely forced into the above described check engagement position, etc.).

By way of comparison, FIG. 6 illustrates a perspective view of a different check, check 115, contemplated by an alternate embodiment of the invention. According to this embodiment of the invention, a "cross bar" stabilizer, shown for example at 193, is used further to enhance check 115's rigidity, the check's ability to function as a freestanding element once inserted into a valve housing and enhance the false engagement protection feature of depicted check 115.

One or more of such stabilizers could be employed to design in any desired degree of rigidity and false engagement protection desired. Those skilled in the art will readily appreciate that there by judicious choice of different materials from which the check is fabricated (plastics, elastomers, etc.), and by varying deformable member dimensions, etc., different degrees of rigidity, etc., may be attained.

FIG. 7 illustrates yet another perspective view of a check contemplated by an alternate embodiment of the invention. In this case, check 119 features the use of an "annular ring" stabilizer, shown, for example, at 118, to in an alternate fashion enhance the rigidity, freestanding functionality and false engagement protection characteristics the depicted check.

As with check 118 shown in FIG. 6, check 119 shown in FIG. 7 can employ other stabilizing elements (like a cross bar across the diameter of each annular ring), a variety of material choices, etc., to create a check design to meet any of a wide range of application needs.

Figure 8:
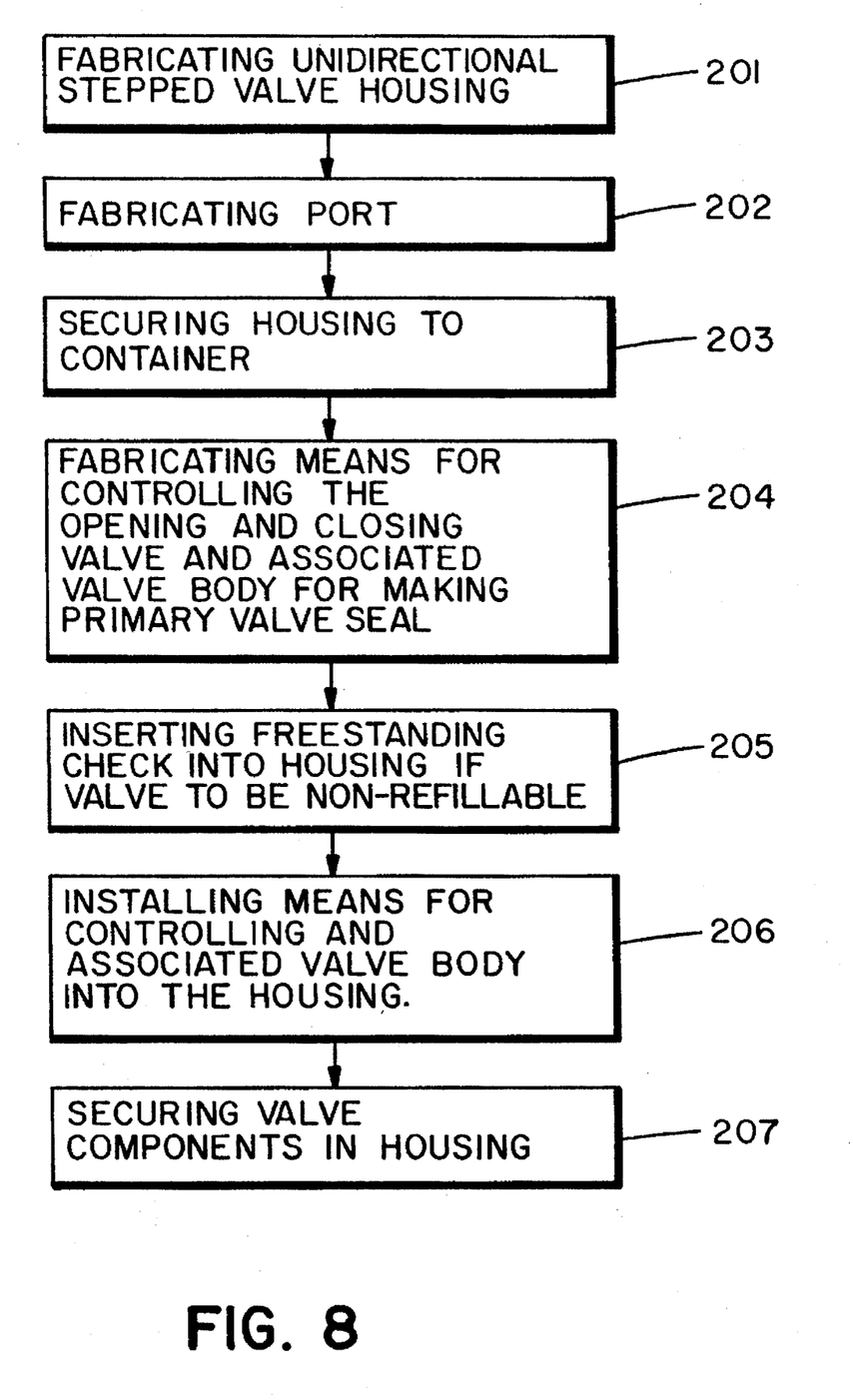
FIG. 8 illustrates a dual purpose manufacturing process, of the type contemplated by a preferred embodiment of the invention, suitable for manufacturing both refillable and non-refillable valves from essentially the same valve design, parts and process steps.

Reference should now be made to FIG. 8 which, as indicated hereinbefore, illustrates a dual purpose manufacturing process of the type contemplated by a preferred embodiment of the invention, suitable for use in manufacturing both refillable and non-refillable valves from essentially the same valve design, parts and process steps.

According to the manufacturing processes contemplated by this aspect of the invention, the steps for making both refillable and non-refillable valves are exactly the same; with the exception that no blocking element is installed in the refillable valve.

The first step of the illustrative process depicted with reference to FIG. 8, shown as step 201 in FIG. 8, involves fabricating a unidirectional stepped valve housing as defined hereinbefore. A preferred housing contemplated by the invention includes a central bore that further includes an upper portion, lower portion and a middle portion located therebetween; wherein the lower portion is narrower than the middle portion which in turn is narrower than the upper portion. Such a housing was depicted and described with reference to FIGS. 1–4 herein and may be used in manufacturing both refillable and non-refillable valves.

The valve housing contemplated by the invention may, without limitation, be fabricated using ferrous metal, non-ferrous metal, plastics, ceramics, etc. In one particularly useful application for the invention, cold finished 1215 steel is used to fabricate the valve housing.

FIG. 8 goes on to depict process step 202 which once again may be applied in the course of manufacturing either a refillable or non-refillable valve. In particular, step 202 calls for fabricating a port in the middle portion of the unidirectional stepped valve housing to facilitate connection of a nozzle thereto.

Another "ambidextrous" step (equally well suited for producing either a refillable valve or non-refillable valve), is step 203 shown in FIG. 8. Step 203 calls for securing the valve housing to the container such that the lower portion of the central bore is in fluid communication with the interior of the container.

The exemplary process being illustrated with reference to FIG. 8 goes on to show step 204 which calls for fabricating means for controlling the opening and closing of the valve and an associated valve body component for making a primary valve seal when the valve is closed. Step 204, yet another dual purpose step used for fabricating both refillable and non-refillable valves, embraces (for example only) the type of process described hereinbefore in which the t-stem 160/valve body 161 combination are assembled together in some fashion; such as, for example, by using previously described snap fit 171 shown in FIG. 1 to be integrally formed as a portion of valve body 161.

As previously indicated, step 204 may be performed using any one of a wide variety of materials and for a wide variety of reasons, examples of which were previously stated herein. There is no intent to limit the practice of the manufacturing aspects of the invention to a process that uses a particular material type for components 160, 161 and whatever mechanism is used to insure their cooperation with one another. However, with this being said, it should be noted that non-ferrous metals, plastics and elastomers are typically used to fabricate valve bodies; whereas t-stem arrangements are typically required to be more rigid and are often formed using a metallic or plastic substance.

The next step depicted in FIG. 8, step 205, is the only step in which any attention needs to be paid as whether or not a non-refillable valve is being manufactured. According to step 205 of the exemplary process, a blocking element comprising a freestanding check (preferably a check that is reversible, symmetrical, including the previously described deformable member(s) and/or possessing at least some of the other check characteristics called for by other previously described aspects of the instant invention), is inserted into the valve housing, whenever the valve is to be used as a non-refillable valve.

According to the preferred embodiment the inserted blocking element is centered within and rests in the lower portion of the central bore in the valve housing, in proximity to the container. In other words, for example, portions 192 and 192a of deformable member 198 of check 106 (clearly shown in FIG. 5) makes contact with and rests on the seat (shown at 150 and 150a in FIG. 4) in the lower portion of central bore 104.

The remaining two steps in the process depicted in FIG. 8, steps 206 and 207, are again suitable for use in manufacturing both refillable and non-refillable valves.

In particular, step 206 calls for installing the means for controlling and the associated valve body component into the valve housing. As shown in FIGS. 1–4, after performing step 206 the valve body component should be located within middle portion 121 of the central bore and the means for controlling should be located at least in part within upper portion 120 of the central bore.

Finally, step 207 calls for securing, within the valve housing, the combination of the means for controlling and the associated valve body component, together with the blocking element (leaving the blocking element as a freestanding item) whenever a blocking element is required to be inserted into the valve housing at step 205.

As those skilled in the art will readily appreciate, all of the aforementioned steps are identical for making both refillable and non-refillable valve; with the exception of the step that requires the insertion of a blocking element at a relatively late stage in the manufacturing process, if a non-refillable valve is desired. Accordingly, the valve housings, control mechanisms, valve bodies, etc., can all be made in advance and stocked with a blocking element being introduced (if desired) just prior to executing the final assembly steps (steps 206 and 207) of the illustrative process described herein.

Further desirable process steps contemplated by preferred embodiments of the invention (not intended to be performed in the order recited; but as needed in the manufacturing process), include: fabricating the means for controlling and the valve body from discrete components, forming screw threads on the surface of the interior upper portion of the central bore in the valve housing so that the means for controlling may be placed in threaded engagement therewith; performing the aforementioned step of installing (step 205), (again, only when the valve is a non-refillable valve with a blocking element to be located within the central bore), in a "careful" predetermined manner so as to avoid driving said blocking element into the container to avoid activating the non-refillable feature of the valve prematurely (specifically, for example, carefully choosing the number of turns of the control means/valve body assembly required to position the valve body in proximity to the check after installation, which will of course depend on the size and shapes of the various components used); and installing sealing means in the valve housing to prevent fluid from within the central bore from flowing beyond the valve body component.

It should be noted that any product of the types of processes contemplated by the present invention, i.e., both refillable valves and non-refillable valves made using such processes, are themselves considered to be within the scope of the invention.

What has been described in detail hereinabove are methods, apparatus and chip fabrication techniques which meet all of the aforestated objectives. As previously indicated, those skilled in the art will recognize that the foregoing description has been presented for the sake of illustration and description only. It is not intended to be exhaustive or to limit the invention to the precise form disclosed, and obviously many modifications and variations are possible in light of the above teaching.

For example, the valves and process described herein find application in foam containment systems, etc.; the novel checks described could be designed with a combination of the above described features, like an annular ring on one end and a cross bar arrangement on the other end, etc., all without departing from the spirit or scope of the present invention.

The embodiments and examples set forth herein were presented in order to best explain the principles of the instant invention and its practical application to thereby enable others skilled in the art to best utilize the instant invention in various embodiments and with various modifications as are suited to the particular use contemplated.

In view of the above it is, therefore, to be understood that the claims appended hereto are intended to cover all such modifications and variations which fall within the true scope and spirit of the invention.

What is claimed is:

1. A non-refillable valve for a pressurized container comprising a blocking element, said blocking element being adapted to occupy an initial location whereby fluid can move in and out of said container past said blocking element, wherein said blocking element can be irreversibly moved to a final location in which said blocking element permits escape of fluid under pressure exerted from the inside of the container, but which automatically closes in response to exposure to an external pressure greater than the pressure inside the container, said blocking element comprising a reversible non-spherical check that integrally includes stop means for preventing the return of said blocking element to said initial location upon movement of said blocking element from said initial location to said final location.

2. Apparatus as set forth in claim 1 wherein said reversible non-spherical check is symmetrical.

3. A non-refillable valve as set forth in claim 1 further comprising a unidirectional stepped valve housing.

4. Apparatus as set forth in claim 3 wherein said unidirectional stepped valve housing further comprises a central bore that includes an upper portion, lower portion and a middle portion located therebetween, wherein said lower portion is narrower than said middle portion which in turn is narrower than said upper portion.

5. A non-refillable valve as set forth in claim 4 wherein said blocking element is initially located at least in part in said lower portion of said unidirectional stepped valve housing.

6. A non-refillable valve as set forth in claim 5 wherein the lower end of said housing is adapted to sealingly engage said pressurized container in a manner that provides communication between said pressurized container and said lower portion of said central bore and further wherein at least a portion of said blocking element is located within said pressurized container when said blocking element is in said final location.

7. A non-refillable valve as set forth in claim 4 further comprising:
(a) a housing side port that communicates with said middle portion of said central bore; and
(b) a nozzle, having a bore lengthwise therethrough, said nozzle being positioned on the side of said housing and being in communication with said middle portion of said central bore via said housing side port.

8. A non-refillable valve as set forth in claim 7 further comprising:
(a) a valve body for making a primary valve seal;
(b) means for controlling the opening and closing of said valve body; and
(c) means for coupling said valve body to said means for controlling.

9. Apparatus as set forth in claim 8 wherein said means for coupling is a snap fit coupling.

10. Apparatus as set forth in claim 8 wherein said valve body is initially held open in a first position within said middle portion of said central bore by said means for controlling to thereby permit the initial charging of said container from a fluid source connected to said nozzle.

11. Apparatus as set forth in claim 10 wherein said means for controlling, when being used to close said valve body, is operative to move said valve body from said first position to a seated position in said middle portion of said central bore to form said primary valve seal and, when closing the valve body for the first time, is operative to forcibly move said blocking element from its initial location to said final location.

12. Apparatus as set forth in claim 11 wherein said means for controlling further comprises means for translating rotational motion into axial motion within said housing and further wherein said means for controlling is positioned at least in part within the upper portion of said central bore.

13. Apparatus as set forth in claim 12 wherein said means for translating further comprises screw threads located on the interior surface of the upper portion of said central bore.

14. Apparatus as set forth in claim 13 wherein said means for controlling further comprises rotatable valve stem means which mechanically advances said valve body back and forth in said central bore in cooperation with said screw threads.

15. Apparatus as set forth in claim 14 wherein the friction between said means for controlling as coupled to said valve body is less than the friction between said means for sealing and said housing.

16. Apparatus as set forth in claim 5 wherein said means for sealing is an o-ring seal.

17. Apparatus as set forth in claim 12 wherein said means for controlling is operative to move said valve body from said first position to and from said seated position in said middle portion of said central bore without rotating said valve body.

18. Apparatus as set forth in claim 7 further comprising means for sealing off the upper portion of said central bore from any fluid in the remainder of said central bore, wherein said means for sealing is located between said valve body and the interior surface of the middle portion of said central bore located in said housing.

19. Apparatus as set forth in claim 4 wherein said reversible non-spherical check further comprises means for centering the reversible non-spherical check in the lower portion of said valve housing.

20. Apparatus as set forth in claim 4 wherein a plurality of vanes are utilized to center said reversible non-spherical check in the lower portion of said valve housing and provide a path for fluid to flow past said reversible non-spherical check when the non-refillable valve is open.

21. Apparatus as set forth in claim 4 wherein a plurality of vanes are utilized to center said reversible non-spherical check in the lower portion of said valve housing and provide a path for fluid to flow past said reversible non-spherical check when said container is being initially charged.

22. Apparatus as set forth in claim 1 wherein said stop means includes at least one deformable radially extending member whose lateral radius is reduced upon movement of said blocking element from said initial location to said final location, wherein said at least one deformable member automatically prevents the return of said blocking element to said initial location once moved to said final location.

23. Apparatus as set forth in claim 22 wherein said at least one deformable radially extending member is flexible.

24. Apparatus as set forth in claim 23 wherein said stop means is made of a resilient plastic.

25. Apparatus as set forth in claim 24 wherein said stop means is made of a resilient plastic.

26. Apparatus as set forth in claim 22 wherein said stop means further comprises at least one radially expanding arm.

27. Apparatus as set forth in claim 22 wherein at least one portion of said stop means comprises an annular ring.

28. Apparatus as set forth in claim 22 wherein at least one portion of said stop means comprises at least one cross bar joining at least two other portions of said stop means.

29. Apparatus as set forth in claim 1 wherein said reversible non-spherical check further comprises means which inherently inhibits false check engagement when said non-refillable valve is being assembled.

30. A blocking element for use in a non-refillable valve, said non-refillable valve including a housing which is attached to a pressurized container with the interior of said housing being in fluid communication with the interior of said container, wherein said blocking element is operative to prevent refilling the container after it is initially charged and further wherein said blocking element allows fluid from within the container to flow out from said container when said non-refillable valve is opened, comprising reversible non-spherical check means which includes stop means for preventing the return of said blocking element to a predefined first location in said housing upon movement of said blocking element from said first location to a predefined second location.

31. A blocking element as set forth in claim 30 wherein said stop means includes at least one deformable radially extending member whose lateral radius is reduced upon movement of said blocking element from said first location to said second location, wherein said at least one deformable member automatically prevents the return of said blocking element to said first location once moved to said second location.

32. A blocking element as set forth in claim 31 wherein said at least one deformable radially extending member is flexible.

33. Apparatus as set forth in claim 30 wherein said reversible non-spherical check further comprises means for centering the reversible non-spherical check in said valve housing.

34. Apparatus as set forth in claim 30 wherein a plurality of vanes are utilized to center said reversible non-spherical check in said valve housing and provide a path for fluid to flow past said reversible non-spherical check when the non-refillable valve is open.

35. Apparatus as set forth in claim 30 wherein said reversible non-spherical check further comprises means for inhibiting false check engagement when said non-refillable valve is being assembled.

36. Apparatus as set forth in claim 30 wherein said stop means further comprises at least one radially expanding arm.

37. Apparatus as set forth in claim 30 wherein at least one portion of said stop means comprises an annular ring.

38. Apparatus as set forth in claim 30 wherein at least one portion of said stop means comprises at least one cross bar joining at least two other portions of said stop means.

39. Apparatus as set forth in claim 30 wherein said reversible non-spherical check is symmetrical.

40. Apparatus as set forth in claim 30 wherein said reversible non-spherical check is freestanding.

41. Apparatus as set forth in claim 30 wherein a plurality of vanes are utilized to center said reversible non-spherical check in said valve housing and provide a path for fluid to flow past said reversible non-spherical check when said container is being initially charged.

42. A non-refillable valve for a pressurized container comprising a blocking element, said blocking element being adapted to occupy an initial location whereby fluid can move in and out of said container past said blocking element, wherein said blocking element can be irreversibly moved to a final location in which said blocking element permits escape of fluid under pressure exerted from the inside of the container, but which automatically closes in response to exposure to an external pressure greater than the pressure inside the container, said blocking element comprising a reversible non-spherical freestanding check that integrally includes stop means for preventing the return of said blocking element to said initial location upon movement of said blocking element from said initial location to said final location.

* * * * *